United States Patent
Baldwin et al.

(10) Patent No.: US 10,650,350 B2
(45) Date of Patent: ***May 12, 2020

(54) WEB CONTENT MANAGEMENT DRIVEN COLLABORATIVE ACTIVITIES SYSTEM AND METHOD

(71) Applicant: International Business Machines Corporation, Armonk, NY (US)

(72) Inventors: Nicholas A. Baldwin, Gladesville (AU); Eric de Morentin Martinez, Manly (AU); Mark C. Hampton, Carlton (AU); Stefan A. Hepper, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/184,103

(22) Filed: Nov. 8, 2018

(65) Prior Publication Data

US 2019/0073635 A1 Mar. 7, 2019

Related U.S. Application Data

(63) Continuation of application No. 15/980,077, filed on May 15, 2018, now Pat. No. 10,198,715, which is a
(Continued)

(51) Int. Cl.
*G06Q 10/10* (2012.01)
*G06F 16/958* (2019.01)

(52) U.S. Cl.
CPC ......... *G06Q 10/103* (2013.01); *G06F 16/972* (2019.01)

(58) Field of Classification Search
None
See application file for complete search history.

(56) References Cited

U.S. PATENT DOCUMENTS 7,818,293 B2 10/2010 Dullanty et al.
8,396,891 B2 3/2013 Tsao
(Continued)

FOREIGN PATENT DOCUMENTS

| WO | 2013009328 A2 | 1/2013 |
| WO | 2013032838 A1 | 3/2013 |

OTHER PUBLICATIONS http://kapost.com/software, "Explore Kapost Software", downloaded Mar. 12, 2013, pp. 1-6.
(Continued)

*Primary Examiner* — Sanchita Roy
(74) *Attorney, Agent, or Firm* — Reza Sarbakhsh

(57) ABSTRACT

A method, computer program product, and computer system for generating, at a computing device, a collaboration container associated with a project. One or more requirements associated with the project is received using the collaboration container. The one or more requirements is mapped into changes for a web content management artifact. The web content management artifact is generated from the collaboration container. Collaboration for the web content management artifact is received. A status of the web content management artifact is promoted to the collaboration container, wherein promoting includes publically publishing at least a portion of the web content management artifact, closing at least the portion of the collaboration container, and archiving at least the portion of the collaboration container.

20 Claims, 5 Drawing Sheets

Related U.S. Application Data continuation of application No. 14/499,327, filed on Sep. 29, 2014, now Pat. No. 10,043,155, which is a continuation of application No. 14/167,412, filed on Jan. 29, 2014, now Pat. No. 10,049,343.

(56) References Cited

U.S. PATENT DOCUMENTS

| | | |
|---|---|---|
| 10,198,715 B2 | 2/2019 | Baldwin et al. |
| 2005/0114829 A1 | 5/2005 | Robin |
| 2006/0008524 A1 | 4/2006 | Takatsuka |
| 2006/0085245 A1 | 4/2006 | Takatsuka et al. |
| 2008/0098030 A1 | 4/2008 | Edd |
| 2009/0094039 A1 | 4/2009 | MacDonald |
| 2010/0082682 A1 | 4/2010 | Kinoshita |
| 2010/0287163 A1 | 11/2010 | Sridhar |
| 2011/0196713 A1 | 8/2011 | Boss |
| 2012/0124552 A1 | 5/2012 | Lin et al. |
| 2012/0124562 A1 | 5/2012 | Lin |
| 2012/0197718 A1 | 8/2012 | Martchenko et al. |
| 2013/0014023 A1 | 1/2013 | Lee |
| 2013/0047061 A1 | 2/2013 | Soin et al. |
| 2014/0075004 A1 | 3/2014 | Van Dusen |
| 2014/0108085 A1 | 4/2014 | Hanniksen |
| 2015/0213037 A1 | 7/2015 | Baldwin et al. |
| 2015/0213145 A1 | 7/2015 | Baldwin et al. |

OTHER PUBLICATIONS http://rivetlogic.com/documents/10157/11101/rl brochure fw.pdf, Unlocking the Potential of Open Source Content Management, Collaboration and Community Solutions, Rivet Logic, downloaded Mar. 12, 2013, pp. 1-4.

Lucas, "3 Tips for Collaborative Website Management", HTC Blog, Nov. 5, 2012, 4 pages, http://blog.htc.ca/2012/11/05/3-tips-for-collaborative-website-management-2/.

| Activity/Task List 402 | Files 404 | Wiki 406 |
|---|---|---|
| Blog 408 | Forum 410 | Custom 412 |

WEB CONTENT MANAGEMENT DRIVEN COLLABORATIVE ACTIVITIES SYSTEM AND METHOD

RELATED APPLICATIONS

The subject application is a continuation application of U.S. patent application Ser. No. 15/980,077, filed on May 15, 2018, which is a continuation application of U.S. Pat. No. 10,043,155, issued on Aug. 7, 2018, which is a continuation of U.S. Pat. No. 10,049,343 issued on Aug. 14, 2018, the entire contents of which are herein incorporated by reference.

BACKGROUND

Websites may be managed under campaigns, which may require the aggregation of various parties' points of view to best craft web content. For example, the creation of web content may be loosely bound to a group discussion around what the content should mean (e.g., sentiment, meaning, concept, etc.) and how it should be presented. Web Content Management site changes and their roll outs may require a greater degree of collaborative coordination of different tasks and people.

BRIEF SUMMARY OF DISCLOSURE

In one implementation, a method, performed by one or more computing devices, may include but is not limited to generating, at a computing device, a collaboration container associated with a project. One or more requirements associated with the project may be received using the collaboration container. The one or more requirements may be mapped into changes for a web content management artifact. The web content management artifact may be generated from the collaboration container. Collaboration for the web content management artifact may be received. A status of the web content management artifact may be promoted to the collaboration container, wherein promoting may include publically publishing at least a portion of the web content management artifact, closing at least the portion of the collaboration container, and archiving at least the collaboration container.

One or more of the following features may be included. The one or more requirements may be received via a forum. Generating the web content management artifact from the collaboration container may include assigning one or more site content items to a user. The forum may display one or more discussion topics associated with the one or more requirements. At least one of the one or more discussion topics may include a link to at least one site content item in a web content management system. One of an approval and a rejection of each content item for the project may be received. Promoting the status of the web content management artifact to the collaboration container may include posting a notification of project approval.

In another implementation, a computing system includes a processor and a memory configured to perform operations that may include but are not limited to generating a collaboration container associated with a project. One or more requirements associated with the project may be received using the collaboration container. The one or more requirements may be mapped into changes for a web content management artifact. The web content management artifact may be generated from the collaboration container. Collaboration for the web content management artifact may be received. A status of the web content management artifact may be promoted to the collaboration container, wherein promoting may include publically publishing at least a portion of the web content management artifact, closing at least the portion of the collaboration container, and archiving at least the collaboration container.

One or more of the following features may be included. The one or more requirements may be received via a forum. Generating the web content management artifact from the collaboration container may include assigning one or more site content items to a user. The forum may display one or more discussion topics associated with the one or more requirements. At least one of the one or more discussion topics may include a link to at least one site content item in a web content management system. One of an approval and a rejection of each content item for the project may be received. Promoting the status of the web content management artifact to the collaboration container may include posting a notification of project approval.

In another implementation, a computer program product resides on a computer readable storage medium that has a plurality of instructions stored on it. When executed by a processor, the instructions cause the processor to perform operations that may include but are not limited to generating a collaboration container associated with a project. One or more requirements associated with the project may be received using the collaboration container. The one or more requirements may be mapped into changes for a web content management artifact. The web content management artifact may be generated from the collaboration container. Collaboration for the web content management artifact may be received. A status of the web content management artifact may be promoted to the collaboration container, wherein promoting may include publically publishing at least a portion of the web content management artifact, closing at least the portion of the collaboration container, and archiving at least the collaboration container.

One or more of the following features may be included. The one or more requirements may be received via a forum. Generating the web content management artifact from the collaboration container may include assigning one or more site content items to a user. The forum may display one or more discussion topics associated with the one or more requirements. At least one of the one or more discussion topics may include a link to at least one site content item in a web content management system. One of an approval and a rejection of each content item for the project may be received. Promoting the status of the web content management artifact to the collaboration container may include posting a notification of project approval.

The details of one or more implementations are set forth in the accompanying drawings and the description below. Other features and advantages will become apparent from the description, the drawings, and the claims.

BRIEF DESCRIPTION OF THE DRAWINGS

FIG. 4 is an illustrative diagrammatic view of a screen image displayed by the collaboration process of FIG. 1 according to one or more implementations of the present disclosure.

Like reference symbols in the various drawings indicate like elements.

DETAILED DESCRIPTION

Figure 1:
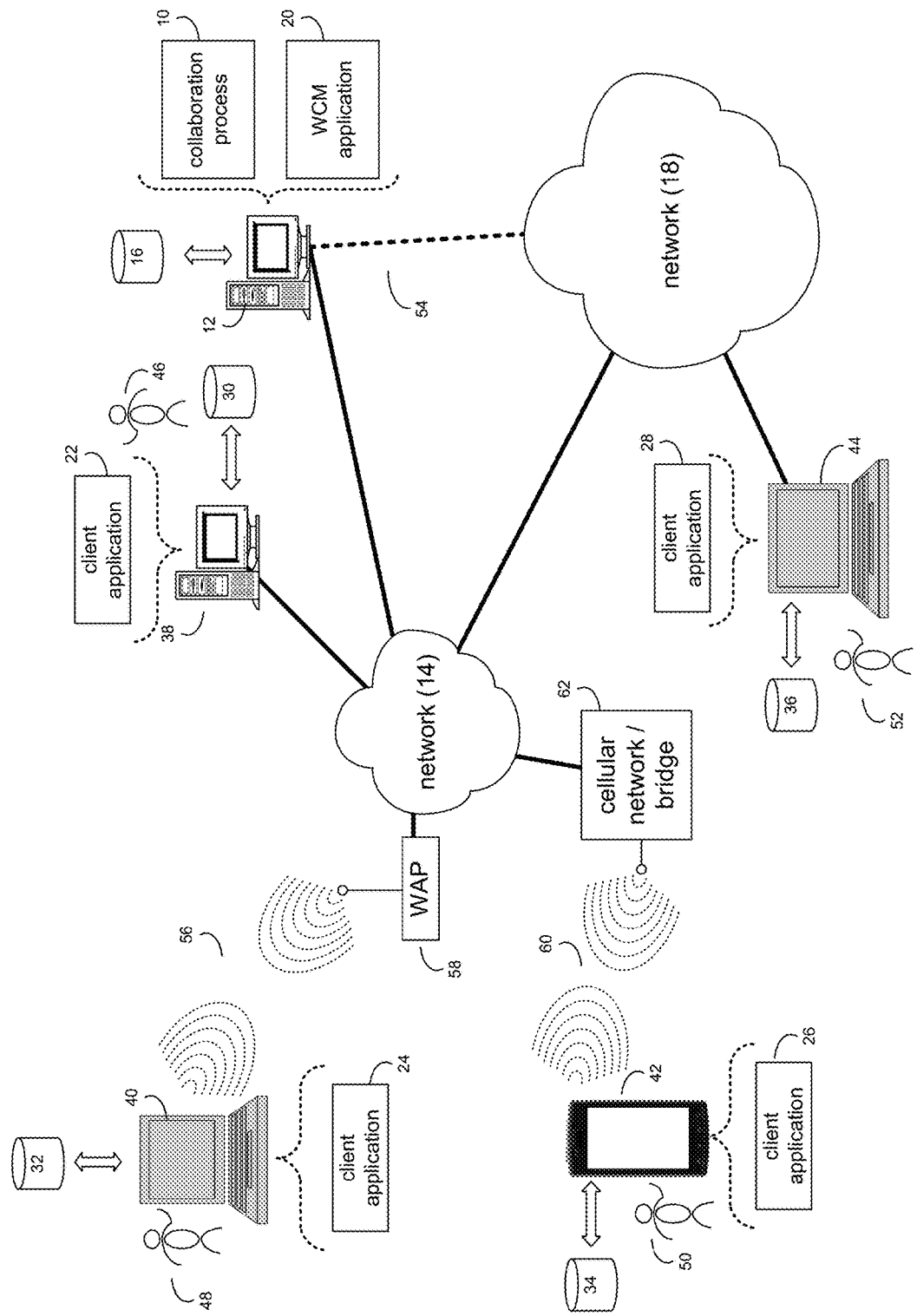
FIG. 1 is an illustrative diagrammatic view of a collaboration process coupled to a distributed computing network according to one or more implementations of the present disclosure.

System Overview:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown collaboration process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, collaboration process 10 may generate, at a computing device, a collaboration container associated with a project. One or more requirements associated with the project may be received using the collaboration container. The one or more requirements may be mapped into changes for a web content management artifact. The web content management artifact may be generated from the collaboration container. Collaboration for the web content management artifact may be received. A status of the web content management artifact may be promoted to the collaboration container, wherein promoting may include publically publishing at least a portion of the web content management artifact, closing at least the portion of the collaboration container, and archiving at least the portion of the collaboration container.

The instruction sets and subroutines of collaboration process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Collaboration process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a web content management (WCM) application (e.g., WCM application 20), examples of which may include, but are not limited to, e.g., an offline processing web content management application, an online processing web content management application, a hybrid online/offline processing web content management application, an extension to WCM application 20, or other application that allows for authoring, collaboration, and administration tools used to create and manage content (e.g., website content). For instance, in some implementations, WCM application 20 may include but is not limited to IBM Web Content Manager. Collaboration process 10 and/or WCM application 20 may be accessed via client applications 22, 24, 26, 28. Collaboration process 10 may be a stand alone application, or may be an applet/application/script that may interact with and/or be executed within WCM application 20, a component of WCM application 20, and/or one or more of client applications 22, 24, 26, 28. WCM application 20 may be a stand alone application, or may be an applet/application/script that may interact with and/or be executed within collaboration process 10, a component of collaboration process 10, and/or one or more of client applications 22, 24, 26, 28. One or more of client applications 22, 24, 26, 28 may be a stand alone application, or may be an applet/application/script that may interact with and/or be executed within and/or be a component of collaboration process 10 and/or WCM application 20. Examples of client applications 22, 24, 26, 28 may include, but are not limited to, e.g., an offline processing web content management application, an online processing web content management application, a hybrid online/offline processing web content management application, an extension to WCM application 20, or other application that allows for authoring, collaboration, and administration tools used to create and manage content (e.g., website content), a social tool application (e.g., IBM Connections Activities or the like) or extension to a social tool application, a standard and/or mobile web browser, an email client application, a textual and/or a graphical user interface, a customized web browser, a plugin, an Application Programming Interface (API), or a custom application. In some implementations, collaboration process 10 may be implemented as one or more extensions on top of existing collaboration and web content management tooling. For example, a "Collaborative Content Management" API of collaboration process 10 may define the extension points for both systems such that the tools used may be interchangeable. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of collaboration process 10 (and vice versa). Accordingly, collaboration process 10 may be a purely server-side application, a purely client-side application, or a hybrid server-side/client-side application that is cooperatively executed by one or more of client applications 22, 24, 26, 28 and/or collaboration process 10.

One or more of client applications 22, 24, 26, 28 may be configured to effectuate some or all of the functionality of WCM application 20 (and vice versa). Accordingly, WCM application 20 may be a purely server-side application, a purely client-side application, or a hybrid server-side/client-side application that is cooperatively executed by one or more of client applications 22, 24, 26, 28 and/or WCM application 20. As one or more of client applications 22, 24, 26, 28, collaboration process 10, and WCM application 20, taken singly or in any combination, may effectuate some or all of the same functionality, any description of effectuating such functionality via one or more of client applications 22, 24, 26, 28, collaboration process 10, WCM application 20, or combination thereof, and any described interaction(s) between one or more of client applications 22, 24, 26, 28, collaboration process 10, WCM application 20, or combination thereof to effectuate such functionality, should be taken as an example only and not to limit the scope of the disclosure.

Users 46, 48, 50, 52 may access computer 12 and collaboration process 10 (e.g., using one or more of client electronic devices 38, 40, 42, 44) directly through network 14 or through secondary network 18. Further, computer 12 may be connected to network 14 through secondary network 18, as illustrated with phantom link line 54. Collaboration process 10 may include one or more user interfaces, such as browsers and textual or graphical user interfaces, through which users 46, 48, 50, 52 may access collaboration process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
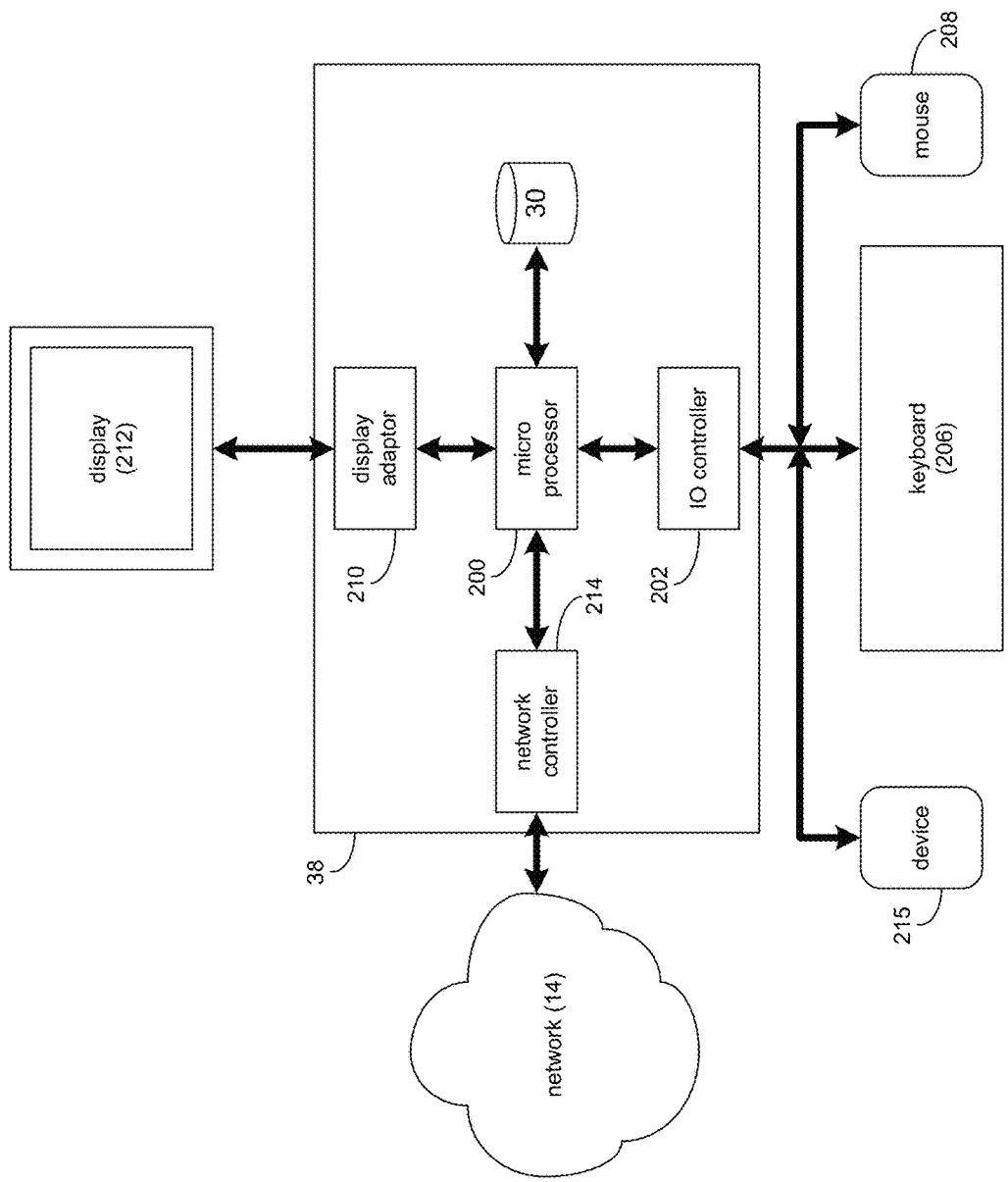
FIG. 2 is a diagrammatic view of a client electronic device of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, collaboration process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device of, e.g., client electronic device 38. An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

Figure 3:
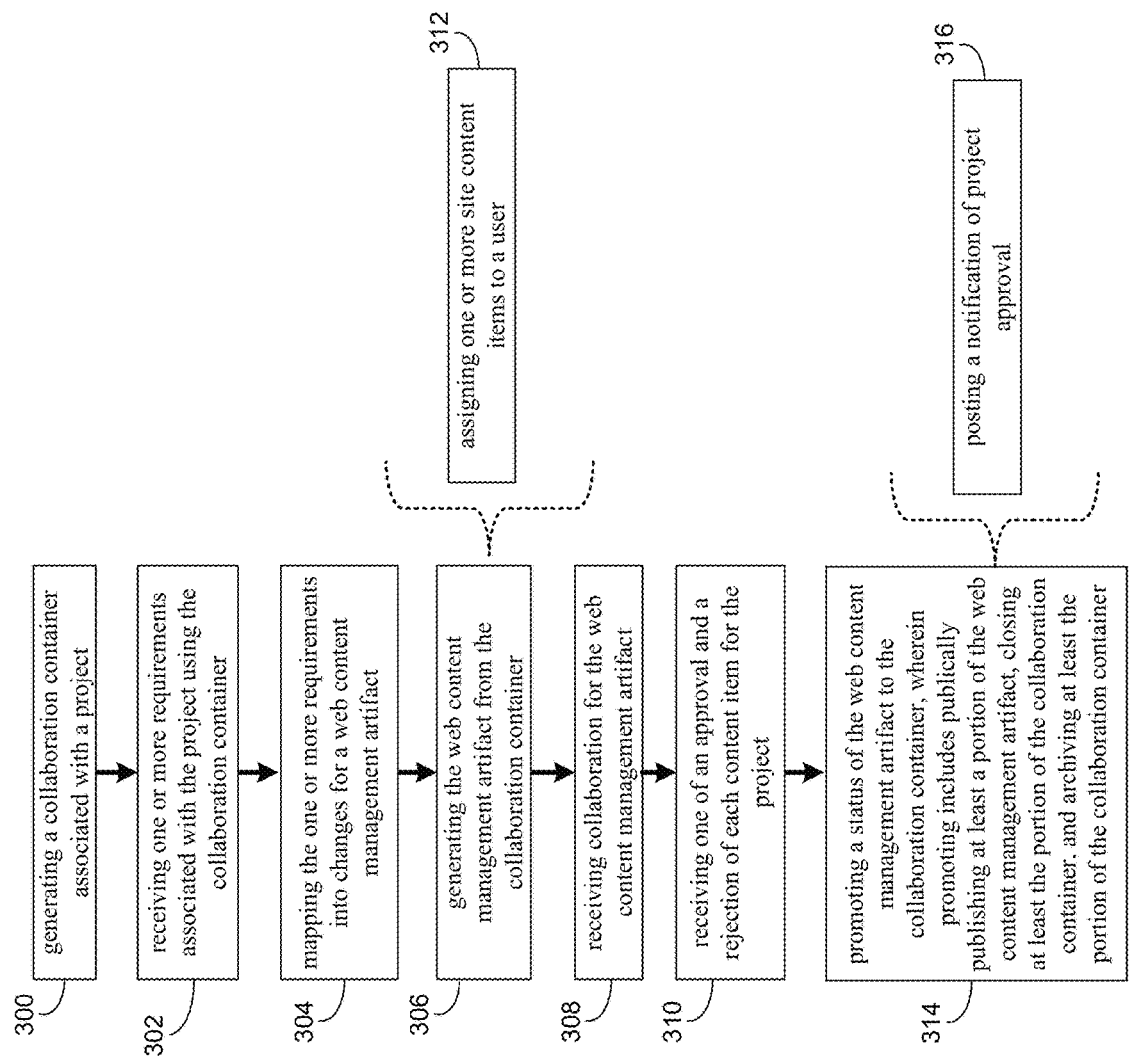
FIG. 3 is an illustrative flowchart of the collaboration process of FIG. 1 according to one or more implementations of the present disclosure.

The Collaboration Process:

As discussed above and referring also to FIGS. 3-5, collaboration process 10 may generate 300, at a computing device, a collaboration container associated with a project. One or more requirements associated with the project may be received 302 by collaboration process 10 using the collaboration container. Collaboration process 10 may map 304 the one or more requirements into changes for a web content management artifact. Collaboration process 10 may generate 306 the web content management artifact from the collaboration container. Collaboration for the web content management artifact may be received 308 by collaboration process 10. Collaboration process 10 may promote 314 a status of the web content management artifact to the collaboration container, wherein promoting includes publically publishing at least a portion of the web content management artifact, closing at least the portion of the collaboration container, and archiving at least the portion of the collaboration container.

Assume for example purposes only that Company X has an MP3 playing widget and is about to launch a new widget add-on (e.g., where clicking on the MP3 playing widget turns it into a TV controller). In the example, Company X may need a new web page or section with rich content, such as other MP3 playing widgets, some promotional spots for the MP3 playing widget landing page, etc., but what exactly the rich content may include is not yet determined. A marketing manager of Company X may determine that the new page or section should closely resemble their web page http://www.CompanyX.com/MP3playingwidget that describes their MP3 playing widgets, but not exactly the same. Thus, in the example, a marketing team of Company X may need to figure out what is actually needed for this project, and it may be helpful to have the ability to track progress of the project.

For example, in some implementations, collaboration process 10 may generate 300, at a computing device (e.g., computer 12), a collaboration container associated with a project. For instance, and referring at least to FIG. 4, a user interface (e.g., user interface 400) associated with collaboration process 10 is shown.

In some implementations, generation 300 of the collaboration container may create the "project" (e.g., an artifact in WCM application 20 that may define a collection of changes) for the new web page project associated with the MP3 playing widget, where a new project may be created in WCM application 20 based on, at least in part, the current project (e.g., community/sub-community/activity), and as will be discussed in greater detail below, collaboration process 10 may enable one or more users of the above-noted marketing team to fill in, e.g., title, description, target date, approvers, etc. and link back to the community/sub-community/activity, and create a content item, page, component to create a new content item in the corresponding project in WCM application 20 based on, at least in part, the item selected, and as will be discussed in greater detail below, collaboration process 10 may enable one or more users of the above-noted marketing team to fill in, e.g., title, description, workflow, target date, approvers, content, etc.

For example, one or more users of the above-noted marketing team (e.g., users 46, 48, and 50) may (e.g., via collaboration process 10) generate 300 a new "space" (e.g., collaboration container) associated with the above-noted project. In some implementations, one or more sections may be created via user interface 400 from a template in the space. For example, the template may include but is not limited to an activity/task list (e.g., activity/task list 402) to, e.g., create and track tasks associated with the project; a files section (e.g., files section 404) to, e.g., store reference materials and assets associated with the project; a wiki (e.g., wiki 406) or the like for the specification of goals/requirements/purpose and work items associated with the project; a blog (e.g., blog 408) for, e.g., sharing information associated with the project; a forum (e.g., forum 410) used for, e.g., discussion for one or more threads about the specification of goals/requirements/purpose and work items associated with the project. In some implementations, user interface 400 may include a custom section (e.g., custom 412) that may enable one or more users of the marketing team to customize what is included in the space.

In some implementations, one or more requirements associated with the project may be received 302 by collaboration process 10 using the collaboration container. In some implementations, the one or more requirements may be received 302 via a forum. For example, the one or more requirements may be received 302 via the above-noted forum 410 of user interface 400. In some implementations, the forum may display one or more discussion topics associated with the one or more requirements. For instance, one or more users of the marketing team may use forum 410 to initiate and/or conduct one or more discussions of what is required for the project (e.g., taking from a high level vision and goals (e.g., from wiki 406) and figuring out what the user experience may look like. Such requirements/discussions may be received 302 via, e.g., a keyboard, such as keyboard 206.

For example, and continuing with the above example, assume that the marketing team of Company X has decide that on their web site a main page is needed with one or more sub-pages to talk about, e.g., how the MP3 music playing widget add-on works, how good the MP3 music playing widget add-on is, the games that work with the MP3 music playing widget add-on, etc. Each of these requirements may be received 302 (e.g., at wiki 406 and/or forum 410). For instance, the marketing team may discuss the requirements in forum 410, where it may be agreed that there should be a main page used as an overview (e.g., focusing on the fun of MP3 music playing widget add-on), a sub-page that shows how the MP3 music playing widget add-on works (e.g., focusing on how simple it is to get the MP3 music playing widget add-on started), a sub-page that shows how the MP3 music playing widget add-on is used (e.g., focus on simplicity), a sub-page that shows some games that may be played via the MP3 music playing widget add-on, information on the add-on itself with links to more add-ons, and then a sub-page with technical specifications of the MP3 music playing widget add-on, which may include a "buy now" link or the like.

For each of the above-noted pages and sub-pages, the main components may start to be figured out in a collaborative fashion, e.g., via forum 410. For instance, the marketing team may collaborate within forum 410 and decide that the main page should have a video of the MP3 music playing widget add-on, a big image of the MP3 music playing widget add-on, and a simple introductory text associated with the MP3 music playing widget add-on. The marketing team may further collaborate within forum 410 and decide that the sub-page that shows how the MP3 music playing widget add-on works should be a 1-2-3 type step page with images for each step, and that the sub-page that shows how the MP3 music playing widget add-on is used should be mainly a video, etc.

The marketing team may further collaborate within forum 410 and decide that the main MP3 music playing widget page should include a promotional spot (e.g., text and image) and that there should be a video and a big image for the homepage of Company X. In some implementations, collaboration process 10 may receive files (e.g., image X, video Y, etc.) for use in the above-noted pages and sub-pages, which may be uploaded and stored in files 404 for later use and/or placed into an assets thread (e.g., within forum 410). For example, the marketing team may further collaborate within forum 410 and decide that image X should be used for the main page, and video Y should be used for the overview, but that there may be other elements still needed that may not be in files 404, which may be desired for inclusion in the web content.

In some implementations, collaboration process 10 may map 304 the one or more requirements into changes for a web content management artifact. For instance, and continuing with the above example, further assume that the structure and types of the project's web pages and their requirements within wiki 406 are now being examined (e.g., the main page is a "landing page" with the sub-page "topic" pages, a games page should have eight individual content items under it with a component to produce a "list" of items, etc.). Further assume that the promotions for the other sub-pages as described within wiki 406 are required to have a new site area (e.g., under promotions) with content items in each. One or more of these classifications may be from WCM application 20 (e.g., communicating via a set of REST services defined to drive collaborative services). In some implementations, once identified, the required content items may be marked and mapped 304 as a special type of item in the activity/task list, e.g. "site content", and may provide a bill of materials for the requirements in wiki 406 (e.g., the changes to the web site as denoted in wiki 406). In some implementations, the bill of materials required may be added to and/or amended from the collaboration container by collaboration process 10 as required.

In some implementations, collaboration process 10 may generate 306 the web content management artifact from the collaboration container. For example, generating 306 the web content management artifact from the collaboration container may include collaboration process 10 assigning 312 one or more site content items to a user. For instance, the one or more site content items may be assigned 312 to users, e.g., as a list (e.g., via activity/task list 402). From this list, one or more users of the marketing group may manually select the content item from activity/task list 402 to create and/or amend/manage the individual content items, or the owner of the work item may be notified. In some implementations, e.g., via user interface 400, the owner of the content item may create the desired content item/type and/or launch into a WCM tool application of WCM application 20 and create one or more items manually in the project.

In some implementations, e.g., via user interface 400, different owners may create a new item, choose the type (e.g., the main "MP3 music playing widget add-on" page will be a "Landing Page" type item, the "Games" page will be an "Index Page" type item, etc.) and may start drafting the content for the item, e.g., via collaboration process 10. In some implementations, collaboration process 10 may generate a reference from the project and the individual site content to the content item that was created (e.g., for reporting and tracking as well as further collaboration).

In some implementations, collaboration for the web content management artifact may be received 308 by collaboration process 10. For instance, new sections on the project form in user interface 400 may display active and current discussion topics from forum 410. Individual items of the project may also have more targeted discussion topics associated with them as well. In some implementations, collaboration process 10 may enable the web page author to view a list of open and completed discussions from the item in WCM application 20. For example, collaboration process 10 may enable the owner of the main "MP3 music playing widget add-on" page to see, e.g., comments about their content as well as other related discussion topics next to the authoring form for the page.

In some implementations, collaboration process 10 may enable, e.g., from a rendered preview of the web page, discussion topics that may be accessed from an in-context toolbar (not shown) showing, e.g., team activity, information relating to the active project, and the item being previewed. Continuing with the example, while work is underway, discussion may break out on specific details of the desired changes, which may be received 308 by collaboration process 10 via forum 410, and for individual items and/or the project itself, collaboration process 10 may enable the author to create a question to be posted to forum 410 for all team members to review, address, and agree (or disagree).

In some implementations, at least one of the one or more discussion topics may include a link to at least one site content item in a web content management system. For example, from the collaboration container, when the topic was created, collaboration process 10 may set the project and target items as reference information such that members of the team may (by selecting the link) jump directly to the target item in WCM application 20, the project, or a rendered preview of the target item.

In some implementations, collaboration process 10 may promote 314 a status of the web content management artifact to the collaboration container, wherein promoting may include publically publishing at least a portion of the web content management artifact, closing at least the portion of the collaboration container, and archiving at least the portion of the collaboration container. For example, the above-noted one or more site content items may be "published" (e.g., made visible to) one or more users (e.g., via activity/task list 402). Similarly, once completed, each of the one or more site content items may be visually designated (e.g., marked, annotated, etc.) as being completed (e.g., closed). In some implementations, collaboration process 10 may enable archiving of the social discussion/collaboration that took place (including the completed one or more site content items), even after the project has finished.

As another example, one of an approval and a rejection of each content item for the project may be received 310 by collaboration process 10. As an example, a single project may contain all the changes necessary from the requirements to achieve the goals of the website campaign. In some implementations, owners of the website campaign may be added as approvers to the project, and the work item may be updated to include a link (as noted above) to take one or more team members of the campaign to a preview of the website for the project. As items progress through their workflow on WCM application 20, collaboration process 10 may enable each approver to either approve or reject one or more of the items, where the approval or rejection may be received 310 by collaboration process 10. In some implementations, collaboration process 10 may enable approval and/or rejection comments to be posted, e.g., via activity/task list.

In some implementations, promoting 314 a status of the web content management artifact to the collaboration container may include collaboration process 10 posting 316 a notification of project approval. For instance, once the project is completely approved and published, collaboration process 10 may complete the project and a notification of completion may be posted 316, e.g., on blog 408 for the project. In some implementations, collaboration process 10 may render a window (e.g., portlet) to display any updates (e.g., from blog 408, forum 410, etc.) in an activity stream related to the current project.

As noted above, in some implementations, collaboration process 10 may enable archiving of the social discussion/collaboration that took place, even after the project has finished. This may enable users to determine why a particular change was made (or not made), which may better aid development of the rest of the project and/or other projects.

Figure 5:
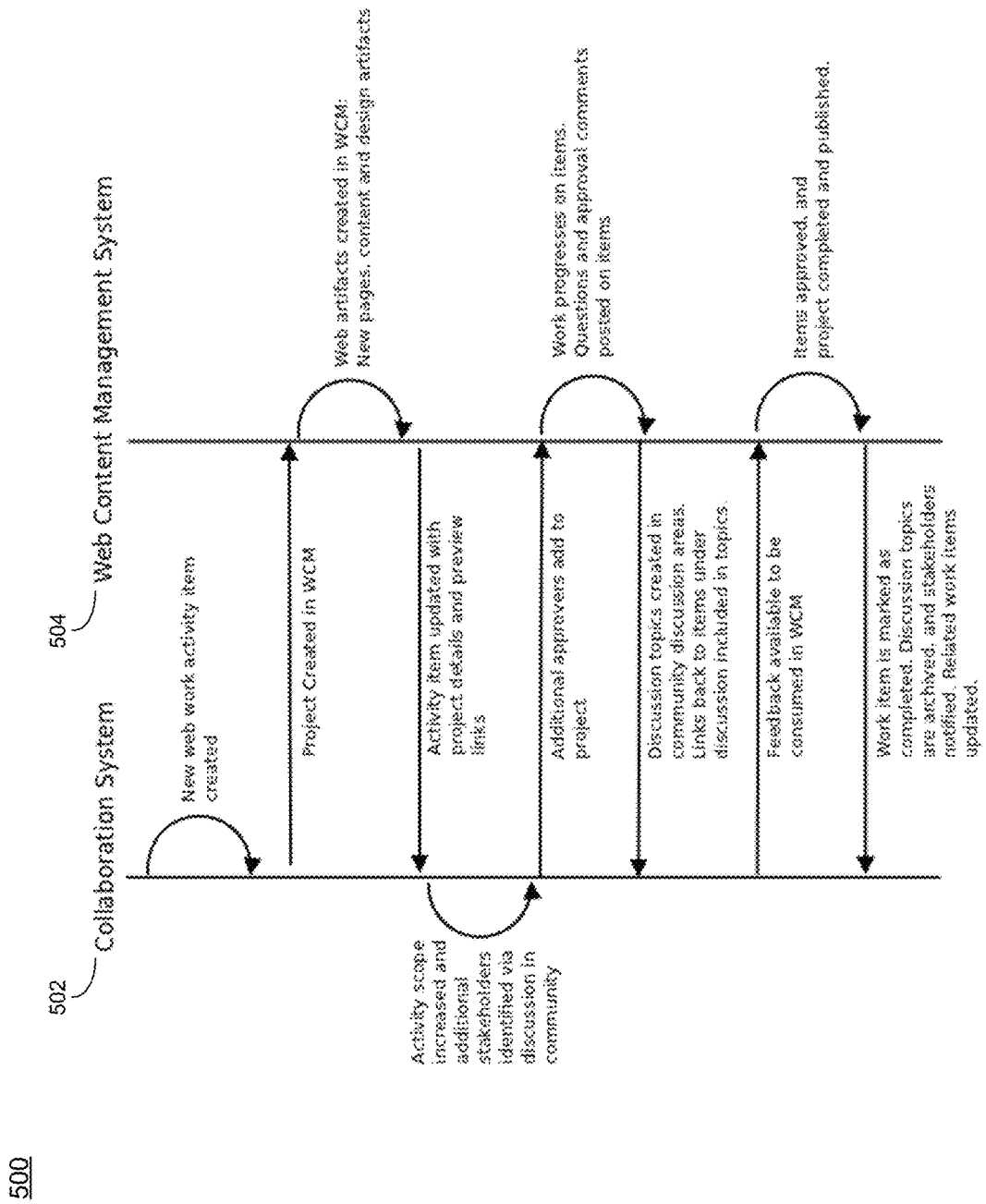
FIG. 5 is an illustrative flowchart of the collaboration process of FIG. 1 according to one or more implementations of the present disclosure.

In some implementations, and referring at least to FIG. 5, an example process flow 500 of collaboration process 10 as described, at least in part, above is shown. In the example, collaboration process 10 and/or WCM application 20 may include a collaboration system 502 (e.g., IBM Connections Activities application) and a WCM system 504 (e.g., IBM Web Content Manager application) as two systems being integrated and used together.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
generating, at a collaboration system, a collaboration container associated with a project, wherein generating the collaboration container generates a web page within a web content management system;
receiving one or more requirements associated with the project using the collaboration container;
mapping the one or more requirements into changes for a web content management artifact;
receiving a user selection of at least one of one or more site content items for the webpage, wherein the selection of the at least one site content item creates the site content item within the web content management system based upon, at least in part, the mapping of the one or more requirements to the one or more web content management artifacts;
in response to the receiving of the user selection, generating the web content management artifact in the web content management system, from the collaboration container in the collaboration system, wherein the web content management artifact comprises the at least one of one or more site content items;
receiving collaboration for the web content management artifact; and
promoting a status of the web content management artifact to the collaboration container, wherein promoting includes publicly publishing at least a portion of the web content management artifact, closing at least the portion of the collaboration container, and archiving at least the portion of the collaboration container.

2. The computer-implemented method of claim 1 wherein the one or more requirements are received via a forum.

3. The computer-implemented method of claim 1 wherein generating the web content management artifact from the collaboration container includes assigning one or more site content items to a user.

4. The computer-implemented method of claim 2 wherein the forum displays one or more discussion topics associated with the one or more requirements.

5. The computer-implemented method of claim 4 wherein at least one of the one or more discussion topics includes a link to at least one site content item in a web content management system.

6. The computer-implemented method of claim 1 further comprising receiving one of an approval and a rejection of each content item for the project.

7. The computer-implemented method of claim 6 wherein promoting the status of the web content management artifact to the collaboration container includes posting a notification of project approval.

8. A computer program product residing on a non-transitory computer readable storage medium having a plurality of instructions stored thereon which, when executed by a processor, cause the processor to perform operations comprising:
generating, at a collaboration system, a collaboration container associated with a project, wherein generating the collaboration container generates a web page within a web content management system;
receiving one or more requirements associated with the project using the collaboration container;
mapping the one or more requirements into changes for a web content management artifact;
receiving a user selection of at least one of one or more site content items for the webpage, wherein the selection of the at least one site content item creates the site content item within the web content management system based upon, at least in part, the mapping of the one or more requirements to the one or more web content management artifacts;
in response to the receiving of the user selection, generating the web content management artifact in the web content management system, from the collaboration container in the collaboration system, wherein the web content management artifact comprises the at least one of one or more site content items;
receiving collaboration for the web content management artifact; and
promoting a status of the web content management artifact to the collaboration container, wherein promoting includes publicly publishing at least a portion of the web content management artifact, closing at least the portion of the collaboration container, and archiving at least the portion of the collaboration container.

9. The computer program product of claim 8 wherein the one or more requirements are received via a forum.

10. The computer program product of claim 8 wherein generating the web content management artifact from the collaboration container includes assigning one or more site content items to a user.

11. The computer program product of claim 9 wherein the forum displays one or more discussion topics associated with the one or more requirements.

12. The computer program product of claim 11 wherein at least one of the one or more discussion topics includes a link to at least one site content item in a web content management system.

13. The computer program product of claim 8 further comprising receiving one of an approval and a rejection of each content item for the project.

14. The computer program product of claim 13 wherein promoting the status of the web content management artifact to the collaboration container includes posting a notification of project approval.

15. A computing system including a processor and a memory configured to perform operations comprising:
- generating, at a collaboration system, a collaboration container associated with a project, wherein generating the collaboration container generates a web page within a web content management system;
- receiving one or more requirements associated with the project using the collaboration container;
- mapping the one or more requirements into changes for a web content management artifact;
- receiving a user selection of at least one of one or more site content items for the webpage, wherein the selection of the at least one site content item creates the site content item within the web content management system based upon, at least in part, the mapping of the one or more requirements to the one or more web content management artifacts;
- in response to the receiving of the user selection, generating the web content management artifact in the web content management system, from the collaboration container in the collaboration system, wherein the web content management artifact comprises the at least one of one or more site content items;
- receiving collaboration for the web content management artifact; and
- promoting a status of the web content management artifact to the collaboration container, wherein promoting includes publicly publishing at least a portion of the web content management artifact, closing at least the portion of the collaboration container, and archiving at least the portion of the collaboration container.

16. The computing system of claim 15 wherein the one or more requirements are received via a forum.

17. The computing system of claim 15 wherein generating the web content management artifact from the collaboration container includes assigning one or more site content items to a user.

18. The computing system of claim 16 wherein the forum displays one or more discussion topics associated with the one or more requirements.

19. The computing system of claim 18 wherein at least one of the one or more discussion topics includes a link to at least one site content item in a web content management system.

20. The computing system of claim 15 further comprising receiving one of an approval and a rejection of each content item for the project.

* * * * *

UNITED STATES PATENT AND TRADEMARK OFFICE
CERTIFICATE OF CORRECTION

PATENT NO. : 10,650,350 B2
APPLICATION NO. : 16/184103
DATED : May 12, 2020
INVENTOR(S) : Nicholas A. Baldwin et al.

Page 1 of 1

It is certified that error appears in the above-identified patent and that said Letters Patent is hereby corrected as shown below:

On the Title Page

Item (72) Inventors, Line 2, please change:
"Eric de Morentin Martinez"
To:
--Eric Martinez de Morentin--

Signed and Sealed this
Eighth Day of December, 2020

Andrei Iancu
*Director of the United States Patent and Trademark Office*